United States Patent Office 2,845,440
Patented July 29, 1958

2,845,440

PROCESS AND INTERMEDIATES FOR THE PREPARATION OF CAROTENOIDS

Otto Isler, Marc Montavon, and Rudolf Rüegg, Basel, Gabriel Saucy, Neuewelt-Munchenstein, and Paul Zeller, Neuallschwil, near Basel, Switzerland, assignors to Hoffmann-La Roche Inc., Nutley, N. J., a corporation of New Jersey No Drawing. Application June 22, 1956
Serial No. 593,038

Claims priority, application Switzerland July 6, 1955

5 Claims. (Cl. 260—340.9)

This invention relates to novel chemical compounds, and to novel processes and novel intermediates useful in the preparation thereof. The broad field of the invention relates to the preparation of $C_{40}$ carotenoids by synthetic methods. The $C_{40}$ carotenoids are useful as coloring agents for foodstuffs and feedstuffs.

In those nomenclatures employed in the instant disclosure wherein $C_{40}$ carotenoid compounds are named on the basis of carotene as a reference structure, the numbers are applied to the forty carbon atoms of the fundamental carotene carbon skeleton according to the numbering system shown in Liebigs Annalen der Chemie, volume 573, page 3 (1951), as a model.

One important aspect of the invention relates to the preparation of 2,6,6-trimethyl-2-cyclohexene-1,4-dione and 2,6,6-trimethyl-1,4-cyclohexanedione and their respective 4-monoketals. These have perfume characteristics and are useful as odorants in the preparation of perfumes and of scented compositions generally. The two diketones above referred to and their respective 4-monoketals are especially useful as intermediates in the synthesis of $C_{40}$ carotenoids found in nature as coloring principles, e. g. zeaxanthin, rhodoxanthin, kryptoxanthin, astaxanthin, etc. Thus, for example, by ketalization of the oxo group in the 4-position of the two above mentioned diketones, followed by condensation of the resulting 4-monoketal with lithium ethoxyacetylide, partial hydrogenation of the condensation product at its triple bond and hydrolysis of the hydrogenation product to the corresponding $C_{11}$ aldehyde, i. e., 2,6,6-trimethyl-4-oxo-2-cyclohexen-1-ylidene-acetaldehyde or 2,6,6-trimethyl-4-oxo-1 - cyclohexylidene - acetaldehyde; followed still further by conversion of the said $C_{11}$ aldehyde by a cyclic process comprising acetalization, condensation of the acetal with a vinyl ether or a propenyl ether, and hydrolysis, there can be obtained in successive stages the corresponding $C_{14}$ aldehyde, the $C_{16}$ aldehyde, and eventually the $C_{19}$ aldehyde. The $C_{19}$ aldehyde can then be converted to the desired carotenoid by metal-organic condensation thereof with acetylene, dehydration and allylic rearrangement of the $C_{40}$ condensation product, partial hydrogenation of the acetylenic bond in the dehydration product, and isomerization of the partial hydrogenation product. Alternative routes for conversion of the $C_9$ compounds of the invention to $C_{40}$ carotenoids are also available.

The compound 2,6,6-trimethyl-1-cyclohexen-4-one employed as starting material in the disclosure of the present invention can be made, for example, from isophorone by known procedures. In the first stage of a comprehensive process according to the invention, 2,6,6-trimethyl-1-cyohexen-4-one is oxidized by means of an organic per acid, e. g. peracetic acid, perbenzoic acid, phthalic mono per acid, performic acid, etc. The unstable primary oxidation product (apparently an oxido compound) is hydrolyzed, without isolation thereof, to 2,6,6-trimethyl-2-cyclohexen-1-ol-4-one. In an advantageous embodiment of the first stage of the process, 2,6,6-trimethyl-1-cyclohexen-4-one is oxidized with peracetic acid in a glacial acetic acid solution at 0°–35° C., the oxidation mixture is made weakly alkaline by addition of 30% sodium hydroxide solution and then shaken at room temperature for one to two hours. The 2,6,6-trimethyl-2-cyclohexen-1-ol-4-one can be isolated by extraction with diethyl ether.

In a second stage, 2,6,6-trimethyl-2-cyclohexen-1-ol-4-one is oxidized to 2,6,6-trimethyl-2-cyclohexene-1,4-dione. This oxidation can be effected by processes known per se, for example by employment of compounds containing hexavalent chromium (such as chromic acid or tertiary butyl chromate) or of manganese dioxide, or of metal alcoholates or metal phenolates (such as aluminum isopropylate or aluminum phenolate) in the presence of carbonyl compounds. An advantageous embodiment of the second stage comprises treating 2,6,6-trimethyl-2-cyclohexen-1-ol-4-one in an inert solvent, such as petroleum ether, benzene, methylene chloride and the like, with excess manganese dioxide at a temperature from 0° C. to the boiling temperature of the solvent employed. It is especially advantageous to oxidize 2,6,6-trimethyl-2-cyclohexen-1-ol-4-one in acetic acid solution with chromic acid at 0°–40° C. The 2,6,6-trimethyl-2-cyclohexene-1,4-dione formed can be obtained by extraction with petroleum ether.

In order to obtain 2,6,6-trimethyl-1,4-cyclohexanedione, the double bond at the 2-position in 2,6,6-trimethyl-2-cyclohexene-1,4-dione is hydrogenated. As a reducing agent for this purpose, zinc and glacial acetic acid at 20°–80° C. are especially suitable. The crystalline product can be obtained by filtering, diluting the reaction mixture with water, and extracting with diethyl ether or petroleum ether.

The ketals of 2,6,6-trimethyl-2-cyclohexene-1,4-dione and 2,6,6 - trimethyl - 1,4-cyclohexanedione, respectively, can be made according to the usual procedures: by heating with alcohols in inert solvents in the presence of acid catalysts, while continuously distilling off the water formed, or by means of orthocarboxylic acid esters in the presence of acid catalysts. Only the oxo group in the 4-position is ketalized. Especially appropriate ketals are the ethylene ketals, which are particulary stable and are therefore well suited for reactions involving metal-organic condensation of the free keto group.

The invention is further disclosed in the following examples, which are illustrative but not limitative thereof. Temperatures are stated in degrees centigrade.

*Example 1*

138 g. of 2,6,6-trimethyl-1-cyclohexen-4-one in 50 ml. of glacial acetic acid was stirred for two hours at 0°–10° with 160 ml. of peracetic acid (containing 530 mg. of peracetic acid per ml.) and the mixture was allowed to stand overnight at 20°. Then, while adding ice, the reaction mixture was made weakly alkaline (ph about 8) by adding 30% aqueous NaOH solution, and the reaction mixture was shaken for one hour at 20°. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in high vacuum. A forerun passed over between 70° and 80°, and then 2,6,6-trimethyl-2-cyclohexen-1-ol-4-one was obtained as an almost colorless oil having B. P. 110°–112°/0.1 mm., $n_D^{20}=1.501$, U. V. maximum at 226 m$\mu$ ($E_1^1=1110$ in petroleum ether solution), after standing for some time. The phenylsemicarbazone had M. P.

189°–190°, U. V. maxima at 240.5 mμ and 285 mμ ($E_1^1$=807 and 778 in ethanol).

Example 2

To 154 g. of 2,6,6-trimethyl-2-cyclohexen-1-ol-4-one in 200 ml. of glacial acetic acid and 500 ml. of water was quickly added dropwise 70 g. of chromic anhydride in 200 ml. of water, while stirring and cooling, so that the temperature did not rise above 30°. The mixture was then stirred overnight at 20°. Then the reaction mixture was saturated with ammonium chloride and was extracted with 1000 ml. of petroleum ether (boiling range 30°–60°). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off. The product, 2,6,6-trimethyl-2-cyclohexane-1,4-dione, was distilled under a water pump vacuum; B. P. 92°–94°/11 mm., a yellow oil which solidified to crystalline form in the refrigerator, $n_D^{21}$=1.490, U. V. maximum at 238 mμ ($E_1^1$=942 in petroleum ether). The phenyl-semicarbazone had M. P. 190°, then resolidified and melted again at 230°, U. V. maxima at 242.5 mμ and 325.5 mμ ($E_1^1$=875 and 580 in ethanol).

Example 3

65 g. of 2,6,6-trimethyl-2-cyclohexene-1,4-dione in 250 ml. of glacial acetic acid was slowly reacted with 130 g. of zinc dust, while stirring, so that the temperature did not rise above 50°. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30°–60°). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product 2,6,6-trimethyl-1,4-cyclohexanedione started to crystallize out; colorless needles, M. P. 63°–65°, having no absorption maximum in the ultraviolet spectrum between 220 mμ and 280 mμ. The phenylsemicarbazone had M. P. 218°–220°, U. V. maximum at 250 mμ ($E_1^1$=1030 in ethanol).

Example 4

34.6 g. of 2,6,6-trimethyl-2-cyclohexene-1,4-dione, 100 ml. of benzene, 19 g. of ethylene glycol and 0.2 g. of p-toluenesulfonic acid were refluxed for seven hours while separating the water which was formed. Upon cooling, the reaction mixture was poured into 300 ml. of 5% sodium bicarbonate solution, and the 2,6,6-trimethyl-4-ethylenedioxy-2-cyclohexen-1-one product was obtained by extraction with diethyl ether and distillation of the extract. The product was obtained as a colorless oil, having B. P. 65°/0.03 mm., $n_D^{22}$=1.490, U. V. max. 225.5 mμ ($E_1^1$=560 in petroleum ether).

Example 5

34.6 g. of 2,6,6-trimethyl-1,4-cyclohexanedione, 100 ml. of benzene, 19 g. of ethylene glycol and 0.2 g. of p-toluenesulfonic acid were refluxed for seven hours while separating the water which was formed. Upon cooling, the reaction mixture was poured into 300 ml. of 5% sodium bicarbonate solution, and the 2,6,6-trimethyl-4-ethylenedioxy-1-cyclohexanone product was obtained by extraction with diethyl ether and distillation of the extract. The product was obtained as a colorless oil, having B. P. 70°/0.02 mm., $n_D^{21}$=1.469.

Example 6

To a lithium amide suspension prepared by dissolving 6.7 g. of lithium in 2000 ml. of liquid ammonia was added slowly, while stirring, 52 g. of 1-methoxy-2-methyl-3-butyn-2-ol. The mixture was stirred for one hour and then 79 g. of 2,6,6-trimethyl-4-ethylenedioxy-1-cyclohexanone was added, and the reaction mixture was stirred overnight at the boiling temperature of the ammonia. 60 g. of ammonium chloride was added and then the ammonia was driven off. The residue was taken up in diethyl ether, and insoluble material was filtered off; the ether solution was washed with a saturated solution of ammonium chloride, then was dried over sodium sulfate, and the ether was driven off. The residue was suspended in 450 ml. of petroleum ether and was extracted four times, each time with 300 ml. of 70% methanol. The methanol extracts were washed three times, each time with 150 ml. of petroleum ether, then were diluted with saturated ammonium chloride solution and the precipitated material was taken up in diethyl ether. The ether solution was washed with water, dried over sodium sulfate, and the ether was driven off. There was thus obtained 92 g. of 4-(2,6,6-trimethyl-4-ethylenedioxy-1-hydroxy-1-cyclohexyl)-2-methyl-1-methoxy-3-butyn-2-ol as a yellow, viscous oil.

92 g. of the latter was dissolved in 3000 ml. of dry diethyl ether, was mixed while stirring at 0°–5° with a solution of 22.5 g. of lithium aluminum hydride in 300 ml. of dry diethyl ether, and the reaction mixture was refluxed for four hours. Then the reaction mixture was cooled with ice, 250 ml. of methanol was added slowly while stirring at 0°–5°, and the clear solution was poured into a mixture of 100 g. of ice and 600 ml. of saturated ammonium chloride solution. The precipitated aluminum hydroxide was filtered off and the precipitate was washed with diethyl ether and added to the filtrate. The combined liquors were washed with water, dried over sodium sulfate and the solvents were driven off. The residue was partioned between petroleum ether and 70% methanol, in the manner indicated above, and from the methanol extracts there was obtained 70 g. of 4-(2,6,6-trimethyl-4-ethylene-dioxy-1-hydroxy-1-cyclohexyl)-2-methyl-1-methoxy-3-buten-2-ol as a light yellow, viscous oil.

70 g. of the latter was mixed with 140 ml. of formic acid and the mixture was heated for 25 minutes at 100°. The reaction mixture was poured onto ice and extracted with diethyl ether, the ethereal solution was washed with water and with dilute sodium bicarbonate solution, dried over sodium sulfate, and the ether was driven off. The residue was dissolved in 200 ml. of glacial acetic acid, 26 ml. of water and 32 g. of sodium acetate were added, and the mixture was heated at 95° for two hours. Then it was diluted with ice water, and was extracted with diethyl ether, the ether extract was washed with water and with dilute sodium bicarbonate solution, dried over sodium sulfate and the ether was driven off. The residue was distilled in vacuum, thereby yielding 4-(2,6,6-trimethyl-4-oxo-1-cyclohexylidene)-2-methyl-2-buten-1-al as a yellow oil having B. P. ca. 110°/0.02 mm., $n_D^{21}$=1.555 (U. V. maximum at 284 mμ in petroleum ether).

Example 7

A solution of 31 g. of 4-(2,6,6-trimethyl-4-oxo-1-cyclohexylidene)-2-methyl-2-buten-1-al in 34 ml. of orthoformic acid ethyl ester and 7 ml. of absolute ethanol was mixed with 0.65 ml. of orthophosphoric acid and 0.05 g. of p-toluenesulfonic acid, and the mixture was allowed to stand for 24 hours at room temperature. 7 ml. of pyridine was added and then the mixture was poured upon ice and dilute sodium bicarbonate solution, the resulting mixture was extracted with petroleum ether, the petroleum ether extract was washed with water, dried over sodium sulfate, the solvent was driven off and the residue was dried in vacuo at 60°. There was thus obtained 40 g. of 4-(2,6,6-trimethyl-4-oxo-1-cyclohexylidene)-2-methyl-1,1-diethoxy-2-butene (U. V. maximum at 248 mμ in petroleum ether).

40 g. of the latter product was dissolved in 600 ml. of dry diethyl ether and was mixed slowly, while stirring at 0°–5°, with a solution of 2.8 g. of lithium aluminum hydride in 40 ml. of diethyl ether. The reaction mixture was stirred for one hour at room temperature, then was cooled to 0°–5°; 20 ml. of methanol was added slowly, and the reaction mixture was poured upon ice and saturated ammonium chloride solution. The precipitated aluminum hydroxide was filtered off and washed with diethyl ether, the ether was added to the filtrate, the combined liquors were dried over sodium sulfate and the solvent material was driven off. There was obtained 39.5 g. of 4-(2,6,6-trimethyl-4-hydroxy-1-cyclohexylidene)-2-methyl-1,1-diethoxy-2-butene.

39.5 g. of the latter was acetylated by mixing it with 40 ml. of pyridine and 20 ml. of acetic anhydride and permitting the mixture to stand for 20 hours. The reaction mixture was poured into ice water, extracted with petroleum ether, the organic layer was washed with cold sodium bicarbonate solution, dried over sodium sulfate and the solvent was driven off, yielding 42 g. of 4-(2,6,6-trimethyl-4-acetoxy - 1 - cyclohexylidene)-2-methyl-1,1-diethoxy-2-butene.

42 g. of the latter was mixed with 400 ml. of glacial acetic acid, 50 ml. of water and 65 g. of sodium acetate and heated at 95° for three hours. Then the reaction mixture was diluted with ice water and was extracted with diethyl ether. The ethereal solution was washed several times with water, dried over sodium sulfate and the ether was driven off. There was thus obtained 31 g. of 4-(2,6,6-trimethyl-4-acetoxy - 1 - cyclohexylidene)-2-methyl-2-buten-1-al (U. V. maximum at 284 mμ in petroleum ether).

*Example 8*

31 g. of 4-(2,6,6-trimethyl-4-acetoxy-1-cyclohexylidene)-2-methyl-2-buten-1-al was dissolved in 40 ml. of toluene, mixed with 16 g. of isopropenyl acetate and 0.2 g. of p-toluenesulfonic acid and the mixture was heated at 120°–140° while continuously removing the acetone which was formed. After approximately two hours, the reaction mixture was cooled down, poured into ice water and extracted with petroleum ether. The petroleum ether solution was washed with cold sodium bicarbonate solution and then with water, dried over sodium sulfate and the solvent was distilled off. There was thus obtained 34 g. of 4-(2,6,6-trimethyl-4-acetoxy-1-cyclohexen-1-yl)-2-methyl-1-acetoxy-1,3-butadiene (U. V. maximum at 262 mμ in petroleum ether).

34 g. of the latter was dissolved in 750 ml. of methanol, mixed with 75 ml. of water and 27 g. of sodium bicarbonate and the mixture was refluxed for six hours while stirring. Then the reaction mixture was diluted with ice water, extracted with diethyl ether, the ether solution was washed with water, dried over sodium sulfate and the ether was driven off. In order to insure acetylation of the nuclear hydroxy group, the residue, presumably containing at least some 4-(2,6,6-trimethyl-4-hydroxy-1-cyclohexen-1-yl)-2-methyl-2-buten-1-al, was mixed with 60 ml. of pyridine and 30 ml. of acetic anhydride and the mixture was allowed to stand for 20 hours at room temperature. 100 ml. of ice water was added and the mixture was then extracted with diethyl ether. The ethereal solution was washed with cold sodium bicarbonate solution and then with water, dried over sodium sulfate and the solvent was driven off. The 4-(2,6,6-trimethyl-4-acetoxy-1-cyclohexen-1-yl)-2-methyl-2-buten-1-al thus obtained can be purified by chromatography and partitioning between solvents. U. V. maximum at 232 mμ in ethanol.

*Example 9*

A solution of 7.3 g. of 4-(2,6,6-trimethyl-4-acetoxy-1-cyclohexen-1-yl)-2-methyl-2-buten-1-al in 6.8 ml. of orthoformic acid ethyl ester was mixed with a solution of 0.13 ml. of orthophosphoric acid in 1.3 ml. of absolute ethanol, 0.005 g. of p-toluenesulfonic acid was added, and the reaction mixture was allowed to stand for 24 hours at room temperature. Then 1.5 ml. of pyridine was added and the mixture was poured into a mixture of 100 g. of 5% sodium bicarbonate solution and 20 g. of ice. The organic material was taken up in diethyl ether, shaken with sodium bicarbonate solution and dried over sodium sulfate. The ether was driven off and the residue was freed, in high vacuum at 50°, of excess orthoformic acid ethyl ester. There was thus obtained 7.9 g. of 4-(2,6,6-trimethyl-4-acetoxy - 1 - cyclohexen-1-yl)-2-methyl-1,1-diethoxy-2-butene, $n_D^{25}=1.4965$ (U.V. absorption maximum at 246 mμ in petroleum ether solution), which was worked up without purification.

7.9 g. of the latter compound was dissolved in 10 ml. of petroleum ether (boiling range 30°–60°), 1.4 ml. of a 10% solution of zinc chloride in ethyl acetate was added, and then a solution of 1.9 g. of ethyl vinyl ether in 2 ml. of petroleum ether (boiling range 30°–60°) was added slowly while stirring, so that the temperature did not rise above 30°. Then the reaction mixture was allowed to stand at room temperature for 20 hours. The petroleum ether was thereupon removed from the reaction mixture under a water pump vacuum at 30°, and to the residue were added 20 ml. of glacial acetic acid, 1 ml. of water and 2 g. of crystalline sodium acetate, and the mixture was heated for three hours at 95° in a carbon dioxide atmosphere. Upon cooling, the solution was poured into 200 ml. of water and the product was extracted in diethyl ether. The ether extract was washed several times with water, then with dilute sodium bicarbonate solution, and was dried. The ether was then driven off, yielding 6.7 g. of 6-(2,6,6-trimethyl-4-acetoxy-1-cyclohexen-1-yl) - 4-methyl-2,4-hexadien-1-al as a viscous, yellow oil, U. V. absorption maximum at 273 mμ–275 mμ (in petroleum ether solution).

*Example 10*

11.5 g. of 4-(2,6,6-trimethyl-4-oxo-1-cyclohexylidene)-2-methyl-2-buten-1-al was mixed with 12.7 ml. of orthoformic acid ethyl ester, 2.4 ml. of absolute ethanol, 0.24 ml. of orthophosphoric acid and 0.05 g. of p-toluenesulfonic acid, and the mixture was allowed to stand for 26 hours at room temperature. Then 2 ml. of pyridine was added and the mixture was poured into 200 ml. of 5% sodium bircarbonate solution. The product was extracted with ether, the ethereal extract was dried, and the ether was driven off. The excess orthoformic ester was driven off in a high vacuum at 50°, yielding 14 g. of 6-(2,6,6-trimethyl-4-oxo - 1 - cyclohexylidene)-2-methyl-1,1-diethoxy-2-butene.

14 g. of the latter product was dissolved in 10 ml. of petroleum ether (boiling range 30–60°) and 2 ml. of a 10% solution of zinc chloride in ethyl acetate was added. Then 3.7 g. of ethyl vinyl ether in 300 ml. of petroleum ether (boiling range 30°–60°) was added slowly, while stirring, so that the temperature of the mixture did not rise above 30°. The reaction mixture was allowed to stand overnight, and then the petroleum ether was removed under a water pump vacuum at 30°. To the residue was added 40 ml. of glacial acetic acid, 2 ml. of water and 4 g. of crystalline sodium acetate and the mixture was stirred for three hours at 95° in a carbon dioxide atmosphere. The reaction mixture was then cooled, diluted with 200 ml. of water and the product was extracted with diethyl ether. The ethereal extract was washed several times with water and with dilute sodium bicarbonate solution. Upon drying the extract and removing the ether therefrom, there was obtained 11.5 g. of 6-(2,6,6-trimethyl-4-oxo-1-cyclohexylidene)-4-methyl-2,4-hexadien-1-al as a yellow, viscous oil having maxima in the ultraviolet absorption spectrum at 317.5 m$\mu$ and 330 m$\mu$ (in petroleum ether solution).

Example 11

A solution of 4.5 g. of 6-(2,6,6-trimethyl-4-acetoxy-1-cyclohexen-1-yl)-4-methyl-2,4-hexadien-1-al in 4 ml. of orthoformic acid ethyl ester was mixed with a mixture of 0.75 ml. of absolute ethanol and 0.075 ml. of orthophosphoric acid. After addition of 0.003 g. of p-toluenesulfonic acid, the mixture was allowed to stand for 24 hours at room temperature. Then 1 ml. of pyridine was added, and the mixture was poured into a mixture of 100 g. of 5% sodium bicarbonate solution and 10 g. of ice. The product was extracted with diethyl ether and the ethereal extract was washed with water. The ether solution was dried over sodium sulfate, the solvent was driven off and the excess orthoformic acid ethyl ester was driven off in high vacuum at 50°. There was thus obtained 4.85 g. of 6-(2,6,6-trimethyl-4-acetoxy-1-cyclohexen-1-yl)-4-methyl - 1,1 - diethoxy - 2,4-hexadiene, U. V. absorption maxima at 286.5 m$\mu$ and 297.5 m$\mu$ in petroleum ether solution.

4.85 g. of the latter compound, without further purification, was dissolved in 7 ml. of absolute benzene, 1 ml. of a 10% solution of zinc chloride in ethyl acetate was added, and to the mixture was slowly added, dropwise, 1.2 g. of ethyl propenyl ether in 2 ml. of absolute benzene, while stirring so that the reaction temperature did not rise above 30°. Then the reaction mixture was stirred overnight at room temperature. The benzene was removed at 30° under water pump vacuum, and to the residue was added 20 ml. of glacial acetic acid, 1 ml. of water and 2 g. of sodium acetate. The mixture was then heated for three hours at 95° in a carbon dioxide atmosphere. Upon cooling, the mixture was poured into 200 ml. of water and the reaction product was extracted with diethyl ether. The ether solution was washed several times with water and then with dilute sodium bicarbonate solution, and was dried. The solvent was driven off, yielding 4.5 g. of 8-(2,6,6-trimethyl-4-acetoxy-1-cyclohexen-1-yl)-2,6-dimethyl-2,4,6-octatrien-1-al as a yellow, viscous resin. The product had a maximum in the ultraviolet absorption spectrum at 312 m$\mu$ (in petroleum ether solution).

Example 12

11.5 g. of 6-(2,6,6-trimethyl-4-oxo-1-cyclohexylidene)-4-methyl-2,4-hexadien-1-al was mixed with 7.5 g. of orthoformic acid ethyl ester, 1.4 ml. of absolute ethanol, 0.14 ml. of orthophosphoric acid and 0.005 g. of p-toluenesulfonic acid, and the mixture was allowed to stand at room temperature for 24 hours. Then 1 ml. of pyridine was added and the mixture was poured into 200 ml. of 5% sodium bicarbonate solution. The resulting mixture was extracted with diethyl ether, the extract was washed with water, dried over sodium sulfate, and the ether and excess orthoformic acid were driven off in a high vacuum at 50°, yielding 13.8 g. of 6-(2,6,6-trimethyl-4-oxo-1-cyclohexylidene)-4 - methyl-1,1-diethoxy-2,4-hexadiene, as a yellow oil having U. V. absorption maxima at 276 m$\mu$, 286 m$\mu$ and 298 m$\mu$ (in petroleum ether solution).

13.8 g. of the latter product was dissolved in 15 ml. of benzene and 3.2 ml. of a 10% solution of zinc chloride in ethyl acetate was added. While stirring, 3.85 g. of ethyl propenyl ether and 2 ml. of benzene was dropped in at such a rate that the temperature did not rise above 30°. Then the reaction mixture was allowed to stand overnight at room temperature, the benzene was taken off in a water pump vacuum at 30°, and to the residue was added 40 ml. of glacial acetic acid, 2 ml. of water and 4 g. of sodium acetate. The mixture was heated for three hours at 95° in a carbon dioxide atmosphere, then was cooled, diluted with 200 ml. of water, and the product was taken off by extraction with diethyl ether. The ether extract was washed several times with water and with dilute aqueous sodium bicarbonate solution, and was then dried over sodium sulfate. The ether was driven off, yielding 12.9 g. of 8-(2,6,6-trimethyl-4-oxo-1-cyclohexylidene)-2,6-dimethyl-2,4,6-octatrien-1-al as a yellow, viscous oil, having maxima in the ultraviolet spectrum at 334 m$\mu$, 350 m$\mu$ and 370 m$\mu$ (in petroleum ether solution).

Example 13

6.3 g. of 8-(2,6,6-trimethyl-4-acetoxy-1-cyclohexen-1-yl)-2,6-dimethyl-2,4,6-octatrien-1-al in 75 ml. of absolute benzene was dropped quickly into a suspension of acetylene dimagnesium bromide prepared from 2.7 g. of magnesium, 18.5 g. of n-hexyl bromide, 50 ml. of absolute diethyl ether and acetylene. The mixture was heated in a nitrogen atmosphere while stirring for three hours at 60°. Then the reaction mixture was poured into a mixture of ice water and a little dilute sulfuric acid and the product was extracted with diethyl ether. The ether solution was washed with dilute aqueous sodium bicarbonate solution and water, was dried over sodium sulfate and then the ether was driven off. There was thus obtained 6.5 g. of 1,18-di-(2,6,6-trimethyl-4-acetoxy-1-cyclohexen-1-yl)-3,7,12,16 - tetramethyl - 2,4,6,12,14,16-octadecahexaen-9-yne-8,11-diol (U.V. maxima at 310 m$\mu$ and 323.5 m$\mu$), which was used in the next stage without further purification.

6.5 g. of the last mentioned product was dissolved in 115 ml. of methylene chloride and 4.3 ml. of glacial acetic acid. 4.6 ml. of concentrated hydrobromic acid (60% by weight HBr) was added at minus 40°, while stirring, over a period of 20 seconds The mixture was stirred vigorously for an additional period of 1.5 minutes at minus 35°, then 115 ml. of water was added and the mixture was stirred for an additional period of three hours at 0°. The methylene chloride solution was washed with dilute sodium bicarbonate solution and water, and was dried over sodium sulfate, and the solvent was driven off. The residue was shaken for 12 hours at room temperature with 60 ml. of diethyl ether, 100 ml. of methanol and 10 g. of potassium hydroxide. The mixture was diluted with water and the ether layer was washed thrice with water. The ether layer was dried, the solvent was driven off, and the crude product thus obtained was chromatographed on a column of 500 g. of aluminum oxide (Wölm, activity grade I plus 4% water). The 15,15'-dehydrozeaxanthin was eluted with a mixture of equal parts of methylene chloride and petroleum ether (boiling range 30°–60°). It was then recrystallized by dissolving in methylene chloride and adding petroleum ether (boiling range 70°–100°) while continuously distilling off methylene chloride. M. P. 207°–208°. U. V. absorption maxima at 430 m$\mu$ and 458 m$\mu$ ($E_1^1$=1923 and 1587).

Example 14

In precisely the same manner described in Example 13 above, 6.3 g. of 8-(2,6,6-trimethyl-4-acetoxy-1-cyclohexylidene)-2,6-dimethyl-2,4,6-octatrien-1-al [obtained by acetylation of 8-(2,6,6-trimethyl-4-oxo - 1 - cyclohexylidene)-2,6-dimethyl-2,4,6-octatrien-1-al] was converted to 15,15'-dehydrozeaxanthin, M. P. 207°–208°.

Example 15

350 mg. of 15,15'-dehydrozeaxanthin, 150 ml. of toluene, 200 ml. of ethyl acetate, 700 mg. of 5% palladium-on-calcium carbonate catalyst containing lead [Lindlar, Helvetica Chimica Acta 35, 450 (1952)] and 0.02 ml. of quinoline were shaken at 20° with elemental hydrogen until 1.1 mol of hydrogen was absorbed. The reaction mixture was filtered and the filtrate was concentrated in vacuo. The residue comprised essentially 15,15'-mono-cis-zeaxanthin.

Example 16

1 g. of 15,15′-mono-cis-zeaxanthin was suspended in 60 ml. of high boiling petroleum ether and was refluxed for 20 hours in a carbon dioxide atmosphere. The mixture was chilled and the crystalline precipitate was filtered off. The crystalline material was then recrystallized from a mixture of methylene chloride and petroleum ether. There was thus obtained all-trans-zeaxanthin, M. P. 205–206°, U. V. absorption maxima at 452 m$\mu$ and 480 m$\mu$ (in petroleum ether). The product all-trans-zeazanthin obtained by the above procedure can be used as an additive to feedstuffs in order to impart yellow-orange coloration thereto.

We claim:

1. A process which comprises oxidizing 2,6,6-trimethyl-1-cyclohexen-4-one by mixing it with an organic per acid thereby producing 2,6,6-trimethyl-2-cyclohexen-1-ol-4-one, oxidizing the latter by mixing it with a hexavalent chromium compound thereby producing 2,6,6-trimethyl-2-cyclohexene-1,4-dione, and converting the latter to 2,6,6-trimethyl-4-ethylenedioxy-2-cyclohexen-1-one.

2. 2,6,6-trimethyl-2-cyclohexen-1-ol-4-one.

3. 2,6,6-trimethyl-4-ethylenedioxy-2-cyclohexen-1-one.

4. A process which comprises oxidizing 2,6,6-trimethyl-1-cyclohexen-4-one by mixing it with an organic per acid thereby producing 2,6,6-trimethyl-2-cyclohexen-1-ol-4-one, oxidizing the latter by mixing it with a hexavalent chromium compound thereby producing 2,6,6-trimethyl-2-cyclohexene-1,4-dione, hydrogenating the latter by mixing it with zinc and glacial acetic acid thereby producing 2,6,6-trimethyl-1,4-cyclohexanedione, and converting the latter to 2,6,6-trimethyl-4-ethylenedioxy-1-cyclohexanone.

5. 2,6,6-trimethyl-4-ethylenedioxy-1-cyclohexanone.

References Cited in the file of this patent

Gibson et al.: J. Chem. Soc. 1930 pp. 1184–1201.

UNITED STATES PATENT OFFICE
CERTIFICATE OF CORRECTION

Patent No. 2,845,440                                        July 29, 1958

Otto Isler et al.

It is hereby certified that error appears in the printed specification of the above numbered patent requiring correction and that the said Letters Patent should read as corrected below.

Column 3, line 20, for "-cyclohexane-" read -- -cyclohexene- --; column 4, line 44, for "partioned" read -- partitioned --; column 6, line 1, for "e-" read -- be- --; line 38, for "in" read -- with --; line 49, for "0.05 g." read -- 0.005 g. --; line 53, for "bircarbonate" read -- bicarbonate --.

Signed and sealed this 21st day of October 1958.

(SEAL)

Attest:

KARL H. AXLINE                                              ROBERT C. WATSON

Attesting Officer                                            Commissioner of Patents